United States Patent [19]

Grendon

[11] 4,425,178

[45] Jan. 10, 1984

[54] RESIN HARDENER AND METHOD FOR ITS USE

[75] Inventor: William C. Grendon, Federal Way, Wash.

[73] Assignee: Weyerhaeuser Company, Tacoma, Wash.

[21] Appl. No.: 321,361

[22] Filed: Nov. 16, 1981

[51] Int. Cl.³ .............................................. C09J 5/02
[52] U.S. Cl. ........................... 156/307.3; 106/163 R; 106/203; 106/204; 106/287.24; 156/328; 156/335; 428/529; 524/14; 524/15; 524/16; 524/321; 524/596; 525/503; 528/155
[58] Field of Search .................. 106/203, 204, 163 R, 106/287.24; 428/529; 528/155; 156/328, 335, 307.3; 525/503; 524/14, 321, 15, 596, 16

[56] References Cited

U.S. PATENT DOCUMENTS

| | | | |
|---|---|---|---|
| 2,204,384 | 6/1940 | Salisbury | 106/162 |
| 2,385,374 | 9/1945 | Rhodes | 528/155 |
| 3,238,158 | 3/1966 | Conca et al. | 524/16 |
| 4,061,620 | 12/1977 | Gillern | 524/841 |
| 4,175,065 | 11/1979 | Andersson | 528/155 |

Primary Examiner—John J. Gallagher
Attorney, Agent, or Firm—Weyerhaeuser Company

[57] ABSTRACT

The invention is an improved hardener for use with phenolresorcinol-formaldehyde wood bonding adhesives. The hardener is conveniently made and shipped as a stable dry powdered material. It is then slurried in water at the point of use for convenience with continuously mixed and dispensed liquid-liquid, two part adhesive systems. The hardener comprises paraformaldehyde or alphapolyoxymethylene, fillers, viscosity and/or rheology control agents, and a solid acidic material. The latter ingredient is a critical component used to adjust the pH of an aqueous slurry to the range of 4.0 to 5.5. Oxalic acid is preferred. In this pH range, the formaldehyde polymers are stable and the slurried hardener does not give off significant formaldehyde odor for periods up to several days. Bonding performance is improved because the characteristics of the hardener and resulting adhesive have very little variation over time.

15 Claims, No Drawings

RESIN HARDENER AND METHOD FOR ITS USE

BACKGROUND OF THE INVENTION

This invention lies in the field of durable wood bonding adhesives comprising phenol-resorcinol-formaldehyde polymers. It is specifically concerned with improved hardener formulations for these resins.

Room temperature setting phenol-resorcinol-formaldehyde (PFR) resins have been in use for durable wood bonding for approximately four decades. These resins are commonly sold as water-based liquid compositions. They are commonly referred to as novolacs since they require an additional source of methylene groups to effect curing to a cross-linked insoluble product. A methylene group donating curing agent is commonly added to the resin immediately before use to create a wood adhesive. Depending on the composition of the resin and hardener, the mixed adhesive can have a pot life varying between 30 minutes and several hours. The methylene group donor will typically be formaldehyde or one of its water soluble polymers known generally as paraformaldehyde or alpha-polyoxymethylene. The hardener will also normally contain inert materials which serve to control the viscosity and penetration of the mixed adhesive.

Until recent years, most hardeners for PFR resins have been powdered solid materials. These powdered hardeners were mixed batch wise into the resin at the point of use. Typical resins and hardener formulations will be similar to those described in U.S. Pat. No. 3,389,125 to Dietrick et al.

There are numerous disadvantages in using PFR adhesives in batch wise fashion. Because a finite time is required to use a given batch of adhesive, the freshly mixed adhesive will have different characteristics from the adhesive near the end of its useful pot life. This is due to gradual advancement of the adhesive toward its final cured state. Pot life of the adhesive is simply the permissible period of time before is becomes too highly advanced for use.

In an effort to overcome the problems of advancement of the adhesive, liquid hardeners were developed which could be continuously mixed with the resin. Examples of such resin and hardener systems are found in U.S. Pat. Nos. 3,634,276 to Kreibich et al and 4,061,620 to Gillern. When liquid resins are continuously mixed at the point of use with liquid hardeners there is essentially no inventory of mixed resin which can cause pot life problems and variation in adhesive characteristics. Simple and effective mixers have been developed so that the adhesive is mixed on demand. An example of such as mixture is found in U.S. Pat. No. 3,938,467 to Radowicz. Similar mixers to continuously blend a powdered hardener into a liquid resin have also been developed, as evidenced by U.S. Pat. No. 4,201,485 to Walker. However, the so-called continuous liquid-powder blenders have experienced many technical problems and have not found wide acceptance in industry.

Systems using liquid resins and liquid hardeners (liquid-liquid systems) are not without their own problems. A principle trouble has been variation in the characteristics of the hardener over time. The original liquid hardeners contained formalin, but were soon abandoned because of the objectionable formaldehyde odor. This problem was somewhat solved by using paraformaldehyde and later by using alpha-polyoxymethylene to reduce odor. These materials tend to depolymerize over time, yielding monomeric formaldehyde. As a result, the odor increases to objectionable levels and the curing characteristics of the adhesives also change. Pot life and cure time will be shorter when a significant amount of monomeric formaldehyde is present. This effect begins to be noticed immediately after the liquid hardeners are mixed. Within one or two days the formaldehyde odor problem can be severe. Thus, to date there have been unsolved problems for the wood laminator whether he chooses to use a batch liquid-powder system, a continuously mixed liquid-powder system, or a continuously mixed liquid-liquid system. The continuously mixed liquid-liquid system appears to be in the acendency, but the problems of stability and odor have yet to be fully overcome.

SUMMARY OF THE INVENTION

The present invention is a hardener for phenol-resorcinolformaldehyde wood-bonding resins which has improved stability and greatly reduced formaldehyde odor. The hardener itself is normally prepared as a powdered material. This is mixed at the point of use with water in order to form a liquid system which will be stable and have low odor for at least several days. The hardener comprises a finely powdered filler material, a thickening agent which will be effective in an aqueous system, a methylene group donor which will be either paraformaldehyde, alpha-polyoxymethylene or mixtures of these materials, and a sufficient amount of a solid acidic material to adjust the pH of the hardener within a range of 4.0 to 5.5 when the composition is dispersed in water. The hardener composition may optionally contain other materials such as dispersion aids or anti-dusting and anti-caking agents.

A further aspect of the invention is a method of preparing a wood adhesive. This comprises supplying a curable PRF resin and further providing a water-dispersable hardener of the composition just described. This hardener is mixed with water at the point of use to provide an aqueous slurry which is then blended with the resin in the desired proportion to make a room temperature curable PRF wood adhesive. The invention further comprises the method of bonding wood with this adhesive by spreading at least one wood surface with the adhesive and joining this to another wood surface while maintaining contact until bonding occurs.

It is an object of this invention to supply a resin hardener composition which has improved stability and a low formaldehyde odor.

It is a further object of the invention to provide a hardener composition which eliminates pot life problems when using PRF wood adhesives.

It is yet another object to provide a resin hardener composition that will have a low formaldehyde odor for an extended period of time even when mixed as an aqueous dispersion.

It is still another object to provide a resin hardener composition which can be shipped as a stable solid material and readily made into a liquid dispersion at the point of use.

These and many other objects will become readily apparent to one skilled in the art on reading the following detailed description and examples of the invention.

DESCRIPTION OF THE PREFERRED EMBODIMENTS

The hardener in a PFR resin system is normally expected to serve several functions over and above supplying a methylene group donor for curing the resin. It will frequently contain a viscosity control agent which is often necessary to control sag of the adhesive when spread on a vertical surface. It will also normally contain materials which control penetration of the adhesive into the matrix being bonded. Both viscosity and penetration control agents are frequently lumped into a category simply called "fillers". In addition to the functions just named, fillers also serve a useful purpose in improving dispersion of the hardener into what is normally a high viscosity liquid resin. There is no sharp dividing line between fillers used for penetration control and thickening agents, since the materials normally used often serve both functions. In the present description, the term "filler" will be used to indicate those materials which primarily serve as penetration control agents. "Thickening agents" are those materials which primarily serve a function of viscosity and rheology control in the mixed adhesive.

A number of materials are suitable as fillers in the present invention. These include wood flour, nutshell flours, finely ground tree bark or bark fractions, non-swelling clays, such as kaolinite or mixtures of these materials.

Thickening agents are selected from the group of natural attapulgite clays, montmorillonite (or bentonitic) clays, pyrogenic silica, or mixtures of these materials. Attapulgite clay, which is a preferred thickening agent, is an acicular magnesium aluminum silicate which has gelling properties in either aqueous or organic systems. Depending on the properties desired in the ultimate adhesive, from 2 to 40 parts of the thickening agent will be present in the hardener composition.

The hardener composition may further contain from 0 to 2 parts of a dispersion aid and/or anti-dusting agent. Pine oil and diesel oil are effective in this function with pine oil being a preferred material. Sythetic organic surfactant materials are also suitable.

The hardener composition will also contain as its most important active ingredient from 20 to 75 parts of paraformaldehyde, alphapolyoxymethylene or mixtures thereof. The preferred material is alphapolyoxymethylene because of its greater stability in an aqueous environment. Both paraformaldehyde and alpha-polyoxymethylene are readily available commercial chemicals. Alpha-polyoxymethylene can be easily manufactured from paraformadehyde by several well known methods which involve heat treatment. The simplest involves heating paraformaldehye for approximately 1 month at a temperature in the neighborhood of 60° C. This period can be shortened by the use of an acidic catalyst; e.g., as described in U.S. Pat. No. 3,210,309 to Baker et al or 3,389,125 to Dietrick et al.

A critical feature of the present improved hardener composition is the inclusion of a sufficient amount of a solid acidic material to adjust the pH of the hardener within the range of 4.0 to 5.5 when the composition is dispersed in water. A preferred range is 5.0 to 5.5. It has been discovered that by maintaining an aqueous dispersion of the hardener in this pH range, degradation of the methylene group donor is minimized without adverse effect on the curing properties of the mixed adhesive. Oxalic acid is a preferred material although other acids in a similar pK range such as malonic or tartaric acids or mixtures of these acids are generally suitable.

A preferred composition comprises 5 to 15 parts of finely ground wood flour, 20 to 30 parts of attapulgite clay, 0 to 1.5 parts of a dispersant/anti-dusting agent such as pine oil, from 1.5 to 2.5 parts of oxalic acid so as to adjust the pH of a water dispersion to the range of 5.0 to 5.5, and from 50 to 65 parts of alpha-polyoxymethylene, the total amount to be 100 parts on a weight basis.

The solid materials comprising the improved hardener can be mixed in any order in conventional blending equipment. At the time of use the blended powders are simply mixed with water using conventional equipment. Normally from 25 to 40 parts by weight of the powdered materials will be mixed with from 75 to 60 parts water until a smooth suspension results (1.5 to 3 parts water per part of hardener). There is little tendency for the solid materials to settle out of the suspension; however, occasional gentle stirring may be necessary if the hardener is not used for several days.

The resorcinol resins useful in the adhesive system do not form a part of the present invention. They are well known and are readily available on the market. A preferred resin will be in the 50 to 65 percent solids range preferably about 55 to 65 percent solids. It is desirable that the resin has a water dilutability of at least 1 to 1; i.e., one part of water by weight can be added to one part of resin without gelling or precipitation. An even higher dilutability is preferred in order to facilitate cleanup of equipment with water. A desired resin viscosity is in the range of W to $Z_1$ on the Gardner-Holdt scale. One very suitable resin is described in the aforementioned patent to Kreibich et al U.S. Pat. No. 3,634,276.

Typically from 0.3 to 0.5 parts of liquid hardener suspension will be mixed with 1.0 part of liquid PRF resin to form a ready-to-use wood adhesive.

The following examples will serve to further illustrate the invention.

EXAMPLE 1

A phenol-resorcinol-formaldehyde wood laminating resin is made using the following ingredients.

| | |
|---|---|
| Phenol (100%) | 39.51% |
| Paraformaldehyde (91%) | 12.00% |
| First Water | 9.38% |
| Calcium Acetate | 0.50% |
| Resorcinol | 19.66% |
| Second Water | 15.35% |
| Sodium Hydroxide (50%) | 3.60% |
| TOTAL | 100.00% |

The phenol, first water, paraformaldehyde, and calcium acetate are charged to a resin kettle. The temperatures is raised to reflux (105° C.) uniformly over a 60-minute period and held at reflux for 2½ hours. During the initial stages of the reaction either heatingg or cooling may be required in order to maintain a uniform rate of temperature rise. This phenolformaldehye prepolymer is then cooled to 95° to 98° C. and the resorcinol is added. The mixture is again heated to reflux in approximately 15 minutes and held at reflux temperature for two hours. It is then cooled to 90° to 95° C. and the second water is added. Heating is used as necessary to maintain a temperature of about 85° C. Finally, sodium hydroxide solution is charged to the kettle. The temperature is again raised to reflux over a 15 to 20 minute period and refluxing is continued until the viscosity has reached approximately Z or $Z_1$ on the Gardner-Holdt scale (about 45 minutes). The resin is then cooled and removed to storage. This resin has approximately 62% solids content and a water dilutability of about 1.5 to 1.

EXAMPLE 2

A resin hardener is made by blending the following dry ingredients:

| | |
|---|---|
| Alpha-polyoxymethylene | 61.35% |
| Wood Flour (−200 mesh) | 10.22% |
| Attagel ® 50 attapulgite clay* | 25.56% |
| Oxalic Acid | 1.84% |
| Pine Oil | 1.03% |
| TOTAL | 100.00% |

The dry ingredients are added to a ribbon blender and mixer for approximately 10 to 15 minutes. Pine oil is added following addition of the dry materials. After thorough blending, the hardener is conventionally bagged in containers of convenient size.

EXAMPLE 3

A liquid hardener mix is prepared by adding 32.2 weight percent of the powdered hardener composition of Example 2 and 67.8% water in a tank equipped with a propeller mixer. Mixing is continued until a smooth slurry results. Forty parts by weight of the liquid hardener is added to 100 parts by weight of the resin of Example 1 in a continuous mixer as described in U.S. Pat. No. 3,938,467. The mixed adhesive will have a pot life of approximately 90 minutes at a room temperature of 24° to 25° C. This adhesive is single spread in conventional amounts, typically about 70 lb per thousand square feet, on Douglas-fir for use in making laminated wood structural beams. After layup, the beams are held clamped for approximately eight hours, whereupon the clamps are removed and the beams can be surfaced and prepared for shipment.

Having thus described the invention in the best mode known to the inventor, it will be evident to those skilled in the art, that many variations are possible which would still be considered to be within the scope of the present invention. The invention is to be considered limited only by the appended claims.

What is claimed is:
1. The method of bonding wood comprising:
   a. providing a curable phenol-resorcinol-formaldehyde resin having a water dilutability of at least 1 to 1;
   b. further providing a water dispersible hardener comprising a finely powdered filler material, a thickening agent effective in an aqueous environment, a methylene group donor consisting of paraformaldehyde, alpha-polyoxymethylene or mixtures thereof, and a sufficient amount of a solid acidic material to adjust the pH of the hardener within the range of 4.0 to 5.5 when the hardener is dispersed in water;
   c. making an aqueous slurry of the hardener.
   d. blending a sufficient amount of slurried hardener with the resin to make a phenol-resorcinol-formaldehyde adhesive curable at room temperature.
   e. spreading at least one wood surface with the adhesive; and
   f. joining the spread surface to another wood surface and maintaining the surfaces in contact until bonding occurs.
2. A stable, powdered, water dispersible resin hardener composition comprising:
   a. 20 to 75 parts of a methylene group donor selected from paraformaldehyde, alpha-polyoxymethylene or mixtures thereof;
   b. 30 to 70 parts of a finely powdered filler material;
   c. 2 to 40 parts of a thickening agent effective in an aqueous environment;
   d. 0 to 2 parts of a dispersion aid; and
   e. a sufficient amount of a solid acidic material to adjust the pH of the hardener within the range of 4.0 to 5.5 when the composition is dispersed in water.
3. The composition of claim 2 when the filler is selected from the group of wood flour, nutshell flour, ground bark, kaolinite, or mixtures thereof.
4. The composition of claim 2 where the thickening agent is selected from the group of attapulgite clays, montmorillonite clays, pyrogenic silica, or mixtures thereof.
5. The composition of claims 2, 3, or 4 where the acidic material is selected from the group of oxalic, malonic, tartaric acids or mixtures thereof.
6. The composition of claim 3 where the acid is oxalic acid.
7. The composition of claim 4 where the filler comprises 5 to 15 parts of wood flour, the thickener comprises 20 to 30 parts of attapulgite clay, the dispersant is 0 to 1.5 parts of pine oil, oxalic acid is present in the range of 1.5 to 2.5 parts, and the methylene group donor is present in the range of 50 to 65 parts.
8. A method of making a wood adhesive comprising:
   a. providing a curable phenol-resorcinol-formaldehyde resin having a water dilutability of at least 1 to 1;
   b. further providing a water dispersible hardener comprising a finely powdered filler material, a thickening agent effective in an aqueous environment, a methylene group donor consisting of paraformaldehyde, alpha-polyoxymethylene or mixtures thereof, and a sufficient amount of a solid acidic material to adjust the pH of the hardener within the range of 4.0 to 5.5 when the hardener is dispersed in water;
   c. making an aqueous slurry of the hardener; and
   d. blending a sufficient amount of slurried hardener with the resin to make a phenol-resorcinol-formaldehyde adhesive curable at room temperature.
9. The method of claim 8 where the filler is selected from the group of wood flour, nutshell flour, ground bark, kaolinite, or mixtures thereof.
10. The method of claim 9 where the thickening agent is selected form the group of attapulgite clays, montmorillonite clays, pyrogenic silica, or mixtures thereof.
11. the method of claims 8, 9, or 10 where the acidic material is selected from the group of oxalic, malonic, tartaric acids or mixtures thereof.
12. The method of claim 9 where the acidic material is oxalic acid.
13. The method of claim 12 where the filler comprises 5 to 15 parts of wood flour, the thickener comprises 20 to 30 parts of attapulgite clay, the dispersant is 0 to 1.5 parts of pine oil, oxalic acid is present in the range of 1.5 to 2.5 parts, and the methylene group donor is present in the range of 50 to 65 parts.
14. The method of claim 8 where the ratio of water to hardener in the aqueous slurry is in the range of 1.5 to 3 parts water per part of hardener.
15. The method of claim 14 where the ratio of slurried hardener to resin is in the range of 0.3 to 0.5 parts of hardener per part of resin.

* * * * *

UNITED STATES PATENT AND TRADEMARK OFFICE
CERTIFICATE OF CORRECTION

PATENT NO. : 4,425,178
DATED : January 10, 1984
INVENTOR(S) : WILLIAM C. GRENDON It is certified that error appears in the above—identified patent and that said Letters Patent is hereby corrected as shown below:

In column 5, Example 2, add footnote -- *A product of Engelhard Minerals and Chemicals Corp., Menlo Park, NJ--

Signed and Sealed this

Twelfth Day of June 1984

[SEAL]

Attest:

GERALD J. MOSSINGHOFF

Attesting Officer

Commissioner of Patents and Trademarks